United States Patent
Zhuang et al.

(10) Patent No.: US 8,744,978 B2
(45) Date of Patent: Jun. 3, 2014

(54) PRESENTING SEARCH RESULTS BASED ON USER-CUSTOMIZABLE CRITERIA

(75) Inventors: Ziming Zhuang, Mountain View, CA (US); Longbin Chen, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 750 days.

(21) Appl. No.: 12/506,926

(22) Filed: Jul. 21, 2009

(65) Prior Publication Data

US 2011/0022549 A1    Jan. 27, 2011

(51) Int. Cl.
*G06F 17/30* (2006.01)
*G06F 15/18* (2006.01)

(52) U.S. Cl.
USPC .................................. 706/12; 707/E17.109

(58) Field of Classification Search
None
See application file for complete search history.

(56) References Cited

U.S. PATENT DOCUMENTS

| | | | |
|---|---|---|---|
| 7,765,178 B1 * | 7/2010 | Roizen et al. | 1/1 |
| 2005/0210018 A1 * | 9/2005 | Singh et al. | 707/3 |
| 2006/0041560 A1 * | 2/2006 | Forman et al. | 707/10 |
| 2008/0133488 A1 * | 6/2008 | Bandaru et al. | 707/3 |
| 2008/0215565 A1 * | 9/2008 | Sun et al. | 707/5 |
| 2008/0301281 A1 * | 12/2008 | Wang et al. | 709/224 |

OTHER PUBLICATIONS

Liu, Chen, Furuse, Ohbo, "Improving User's Web Search Experience by Interactive Re-ranking and Zooming Interfaces", Journal of Digital Information Mangement, vol. 7, No. 1, Feb. 2009, pp. 35-43.*
Zhai, Cohen, Lafferty, "Beyond Independent Relevance: Methods and Evaluation Metrics for Subtopic Retrieval" Sigir ACM, SIGIR '03: Proceedings of the 26th annual international ACM SIGIR conference on Research and development in informaion retrieval, 2003.*
Iiu, Chen, Furuse, Ohbo, "Improving User's Web Search Experience by Interactive Re-ranking and Zooming Interfaces", Journal of Digital Information Mangement, vol. 7, No. 1, Feb. 2009, pp. 35-43.*
Zhai, Cohen, Lafferty, "Beyond Independent Relevance: Methods and Evaluation Metrics for Subtopic Retrieval", SIGIR ACM, SIGIR '03,: Proceedings of the 26th Annual International ACM SIGIR conference on Research and Development in Information Retrieval, 2003.*
Unknown, Amazon.com search for mp3 player, http://www.amazon.com/s/ref=nb_ss_0_4?url=search-alias%3Daps&field-keywords=mp3+playe . . . , printed Oct. 19, 2009, 7 pages.
Unknown, Bing.com shopping, http://www.bing.com/shopping?FORM=Z9LH6, printed Oct. 19, 2009, 4 pages.

(Continued)

*Primary Examiner* — Kakali Chaki
*Assistant Examiner* — Walter Hanchak
(74) *Attorney, Agent, or Firm* — Pillsbury Winthrop Shaw Pittman LLP

(57) ABSTRACT

In one embodiment, ranking search results generated in response to search queries comprises: receiving, a search query from a user; identifying a plurality of network contents in response to the search query; determining one or more ranking criteria for the search query; presenting the ranking criteria to the user; receiving from the user one or more weights assigned to one or more of the ranking criteria; ranking the identified network contents based on the ranking criteria and the weights; and presenting the network contents to the user in an order according to their ranking.

21 Claims, 4 Drawing Sheets

(56) References Cited

OTHER PUBLICATIONS

Unknown, Google web search: SearchWiki—Web Search Help, http://www.google.com/support/websearch/bin/answer.py?h1=cn&answer=115764, printed Oct. 19, 2009, 1 page.

Unknown, kayak.com search for flights, http://www.kayak.com/, printed Oct. 19, 2009, 2 pages.

Unknown, Netflix search for popular new releases, http://www.netflix.com/NewReleasesGallery?vt=t1&listid=rrForYou, printed Oct. 19, 2009, 3 pages.

* cited by examiner

← 100

← 110

112 —\
George Washington - Wikipedia, the free encyclopedia
114 —\ George Washington was the leader of the Continental Army in the American
Revolutionary War (1775–1783) and served as the first President of the United
116 —\ States of America (1789–1797).
en.wikipedia.org/wiki/George_Washington

← 120

122 —\
Biography of George Washington
124 —\ WhiteHouse.gov is the official web site for the White House and President
Barack Obama, the 44th President of the United States. This site is a source for
126 —\ ...
www.whitehouse.gov/about/presidents/georgewashington

← 130

132 —\
George Washington: Biography from Answers.com
134 —\ George Washington , U.S. President / Military Leader / Revolutionary War
Figure Born: 22 February 1732 Birthplace: Westmoreland County, Virginia
136 —\ Died:
www.answers.com/topic/george-washington

← 140

142 —\
President George Washington
144 —\ US Presidential Trivia for fun and learning. The site also has lesson ideas and
activities for K-12 students. This page features George Washington.
146 —\ www.classroomhelp.com/lessons/Presidents/washington.html

← 150

152 —\
American President: George Washington
154 —\ In-depth essays created by the University of Virginia on George Washington's
life and administration. ... George Washington. At a Glance. Term: 1st President
156 —\ ...
millercenter.org/academic/americanpresident/washington

PRESENTING SEARCH RESULTS BASED ON USER-CUSTOMIZABLE CRITERIA

TECHNICAL FIELD

The present disclosure generally relates to improving the quality of search results generated by search engines and more specifically relates to ranking network contents identified in search results generated in response to search queries based on their relative degrees of relevance with respect to the search queries and customized ranking criteria.

BACKGROUND

The Internet provides a vast amount of information. The information is stored at many different sites, such as on computers and servers, in databases, etc., around the world. These different sites are communicatively linked to the Internet through various network infrastructures. Any person may access the publicly available information via a suitable network device connected to the Internet.

Due to the sheer amount of information available on the Internet, it is impractical as well as impossible for a person, e.g., a network user, to manually search throughout the Internet for specific pieces of information. Instead, most people rely on different types of computer-implemented tools to help them locate the desired information. One of the most commonly and widely used tools is a search engine, such as the search engines provided by Yahoo! Inc. and Google Inc. To search for information relating to a specific subject matter on the Internet, a person typically provides a short phrase describing the subject matter, often referred to as a "search query", to a search engine. The search engine conducts a search based on the query phrase using various search algorithms and generates a search result that identifies network contents that are most likely to be related to the search query. The network contents are presented to the person, often in the form of a list of links, each link being associated with a different web page that contains some of the identified network contents. The person is then able to click on the links to view the specific network contents contained in the corresponding web pages as he wishes.

There are continuous efforts to improve the qualities of the search results generated by the search engines. Accuracy, completeness, presentation order, and speed are but a few of the performance aspects of the search engines for improvement.

SUMMARY

The present disclosure generally relates to improving the quality of search results generated by search engines and more specifically relates to ranking network contents identified in search results generated in response to search queries based on their relative degrees of relevance with respect to the search queries and customized ranking criteria.

In particular embodiments, upon receiving from a user a search query, a plurality of network contents is identified in response to the search query. One or more ranking criteria are determined for the search query and presented to the user. Upon receiving from the user one or more weights assigned to one or more of the ranking criteria, the network contents are ranked based on their relative degrees of relevance to the search query, the ranking criteria, and the weights. The network contents are presented to the user in an order according to their ranking.

These and other features, aspects, and advantages of the disclosure are described in more detail below in the detailed description and in conjunction with the following figures.

BRIEF DESCRIPTION OF THE DRAWINGS

FIG. 1 illustrates an example search result.

DETAILED DESCRIPTION

Figure 2:
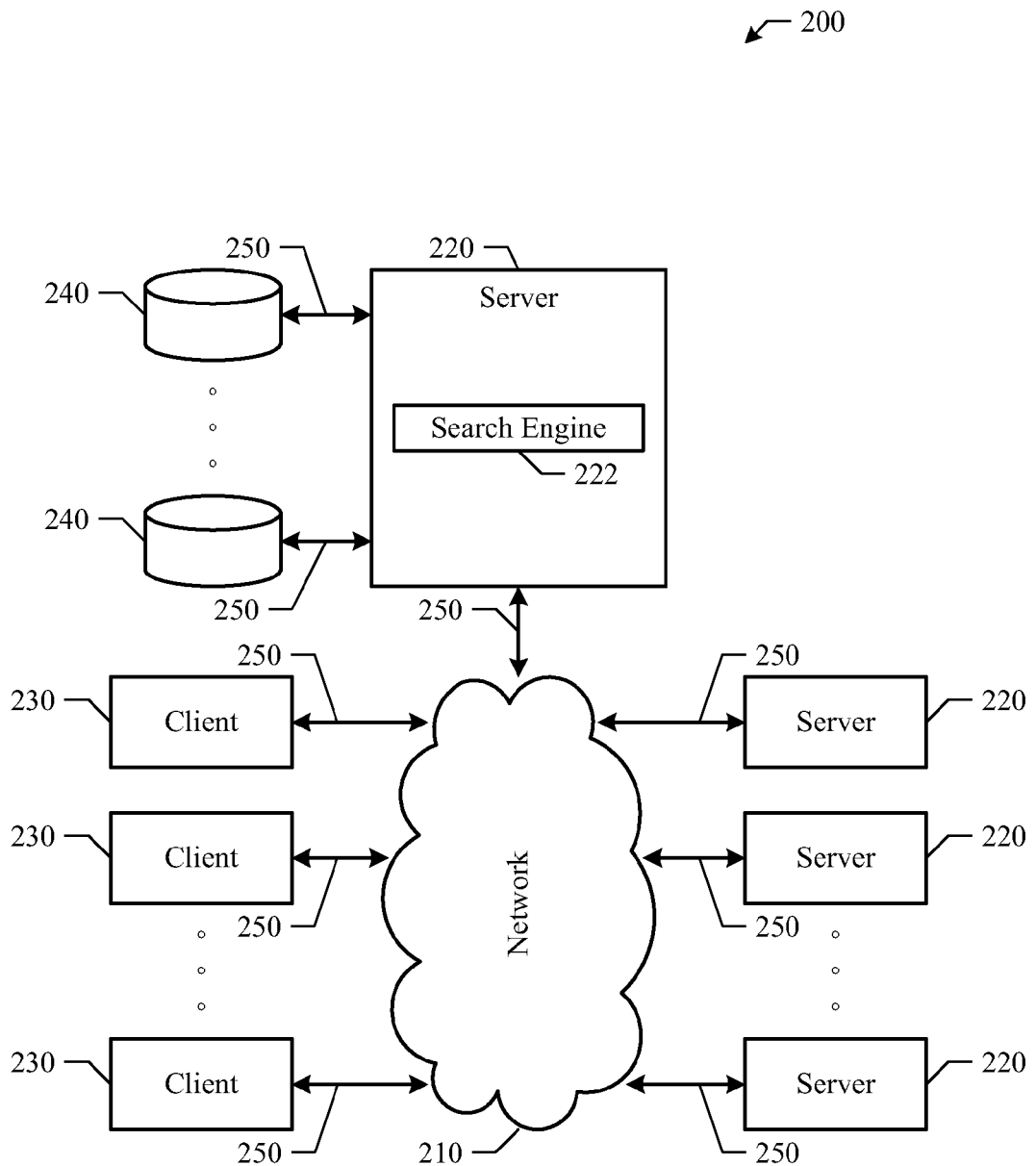
FIG. 2 illustrates an example system for customizing the ranking of the network contents identified in response to the search queries.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

When a network user employs a search engine to help him locate information on the Internet that relates to a specific subject matter, typically, the user provides a search query to the search engine. The search query usually is a short phrase that describes the subject matter of interest. In response, the search engine conducts a search based on the search query using various search algorithms to identify network contents that may be related to the subject matter described by the search query. The network contents may be texts, audios, videos, images, executable, etc.

Sophisticated search engines implement many other functionalities in addition to merely identifying the network contents as a part of the search process. For example and without limitation, a search engine usually ranks the identified network contents according to their relative degrees of relevance with respect to the search query, such that the network contents that are relatively more relevant to the search query are ranked higher and consequently are presented to the network user before the network contents that are relatively less relevant to the search query. The search engine may also provide a short summary of each of the identified network contents.

FIG. 1 illustrates an example search result 100 that identifies five network contents 110, 120, 130, 140, 150. Search result 100 is generated in response to an example search query "President George Washington". Note that only five network contents are illustrated in order to simplify the discussion. In practice, a search result may identify hundreds, even thousands of network contents. Network contents 110, 120, 130, 140, 150 each includes a title 112, 122, 132, 142, 152, a short summary 114, 124, 134, 144, 154 that briefly describes the respective network content, and a clickable link 116, 126, 136, 146, 156 in the form of a Uniform Resource Locator (URL). Network contents 110, 120, 130, 140, 150 are presented according to their relative degrees of relevance to search query "President George Washington". That is, network content 110 is considered slightly more relevant to search query "President George Washington" than network content 120, which is in turn considered slightly more relevant than network content 130, and so on. Consequently, network content 110 is presented first, i.e., at the top of search result 100, followed by network content 120, network content 130, and so on.

Currently, most search engines rank network contents identified in response to search queries according to their relative degrees of relevance with respect to the search queries. The network users requesting the searches do not have any control over how the network contents are ranked. However, sometimes, relevance may not be the only or the most important ranking criteria preferred by some network users. For example, for the search query "California universities", some users may wish to rank the university websites identified by the search engine according to the US News University Ranking as well as relevance. Similarly, for the search query "www conference proceedings", some users may wish to rank the papers identified by the search engine according to their publication dates in addition to or instead of relevance.

To enable the network users to customize the ranking criteria used to rank the network contents identified in response to the search queries, in particular embodiments, upon receiving a search query from a network user, one or more ranking criteria may be determined for the search query. The ranking criteria are presented to the network user, and the network user may specify individual weights to some or all of the ranking criteria. The weights indicate how important the specific ranking criteria are to the network user and thus how much they should be considered when ranking the network contents identified in response to the search query. The network contents are ranked according to the ranking criteria together with the user-specified weights.

In particular embodiments, for each search conducted in response to a search query, the network user requesting the search may specify weights to the individual ranking criteria determined for the specific search query. Consequently, the ranking of the network contents may be customized according to individual network users' search intents or needs.

FIG. 2 illustrates an example system 200 for customizing the ranking of the network contents identified in response to the search queries. System 200 includes a network 210 coupling one or more servers 220 and one or more clients 230 to each other. In particular embodiments, network 210 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 210 or a combination of two or more such networks 210. The present disclosure contemplates any suitable network 210.

One or more links 250 couple servers 220 or clients 230 to network 210. In particular embodiments, one or more links 250 each includes one or more wired, wireless, or optical links 250. In particular embodiments, one or more links 250 each includes an intranet, an extranet, a VPN, a LAN, a WLAN, a WAN, a MAN, a communications network, a satellite network, a portion of the Internet, or another link 250 or a combination of two or more such links 250. The present disclosure contemplates any suitable links 250 coupling servers 220 and clients 230 to network 210.

In particular embodiments, each server 220 may be a unitary server or may be a distributed server spanning multiple computers or multiple datacenters. Servers 220 may be of various types, such as, for example and without limitation, web server, news server, mail server, message server, advertising server, file server, application server, exchange server, database server, or proxy server. In particular embodiments, each server 220 may include hardware, software, or embedded logic components or a combination of two or more such components for carrying out the appropriate functionalities implemented or supported by server 220. For example, a web server is generally capable of hosting websites containing web pages or particular elements of web pages. More specifically, a web server may host HTML files or other file types, or may dynamically create or constitute files upon a request, and communicate them to clients 230 in response to HTTP or other requests from clients 230. A mail server is generally capable of providing electronic mail services to various clients 230. A database server is generally capable of providing an interface for managing data stored in one or more data stores.

In particular embodiments, each client 230 may be an electronic device including hardware, software, or embedded logic components or a combination of two or more such components and capable of carrying out the appropriate functionalities implemented or supported by client 230. For example and without limitation, a client 230 may be a desktop computer system, a notebook computer system, a netbook computer system, a handheld electronic device, or a mobile telephone. A client 230 may enable a network user at client 230 to access network 210. A client 230 may have a web browser, such as Microsoft Internet Explorer or Mozilla Firefox, and may have one or more add-ons, plug-ins, or other extensions, such as Google Toolbar or Yahoo Toolbar. A client 230 may enable its user to communicate with other users at other clients 230. The present disclosure contemplates any suitable clients 230.

In particular embodiments, one or more data storages 240 may be communicatively linked to one or more severs 220 via one or more links 250. In particular embodiments, data storages 240 may be used to store various types of information. In particular embodiments, the information stored in data storages 240 may be organized according to specific data structures. Particular embodiments may provide interfaces that enable servers 220 or clients 230 to manage, e.g., retrieve, modify, add, or delete, the information stored in data storage 240.

In particular embodiments, a server 220 may include a search engine 222. Search engine 222 may include hardware, software, or embedded logic components or a combination of two or more such components for carrying out the appropriate functionalities implemented or supported by search engine 222. For example and without limitation, search engine 222 may implement one or more search algorithms that may be used to identify network contents in response to the search queries received at search engine 222, one or more ranking algorithms that may be used to rank the identified network contents, one or more summarization algorithms that may be used to summarize the identified network contents, and so on.

In particular embodiments, a search query or a network content may be associated with a set of ranking criteria. Network contents may have various forms, such as text, audio, video, image, executable, etc. and are often contained in web pages for presenting to the network users. To simplify the discussion, hereinafter, network contents are referred to as web pages, and each web page may contain text, audio, video, image, and other suitable types of contents. The web pages may be static or dynamically generated. Hereinafter, let q denote a search query, P denote a web page, A( ) denote an association function that associates a set of ranking criteria with a search query or a web page, C denote a set of ranking criteria, and c denote a specific ranking criterion. Particular embodiments may define the association function A( ) as:

$$A(q) = C^q = \{c_1^q, c_2^q, \ldots, c_{n_1}^q\}, \text{ and} \quad (1a)$$

$$A(p) = C^p = \{c_1^p, c_2^p, \ldots, c_{n_2}^p\} \quad (1b)$$

where $C^q$ is the set of ranking criteria associated with the search query q, and $C^p$ is the set of ranking criteria associated with the web page p.

In practice, a search engine, e.g., search engine 222, may receive millions of search queries from network users around the world and identify millions of network contents in response to those search queries, all within a very short time period. Furthermore, for the same or similar subject matter, different network users may provide different search queries. For example, to search for information on George Washington, one network user may use the search query "President George Washington", another network user may use the search query "George Washington", a third network user may use the search query "President Washington", a fourth network user may use the search query "the first president of the United States", and so on. Thus, it is often impractical, even impossible to determine a set of ranking criteria for each individual search query received at a search engine or for each individual network content identified by a search engine, especially in real time.

Figure 3:
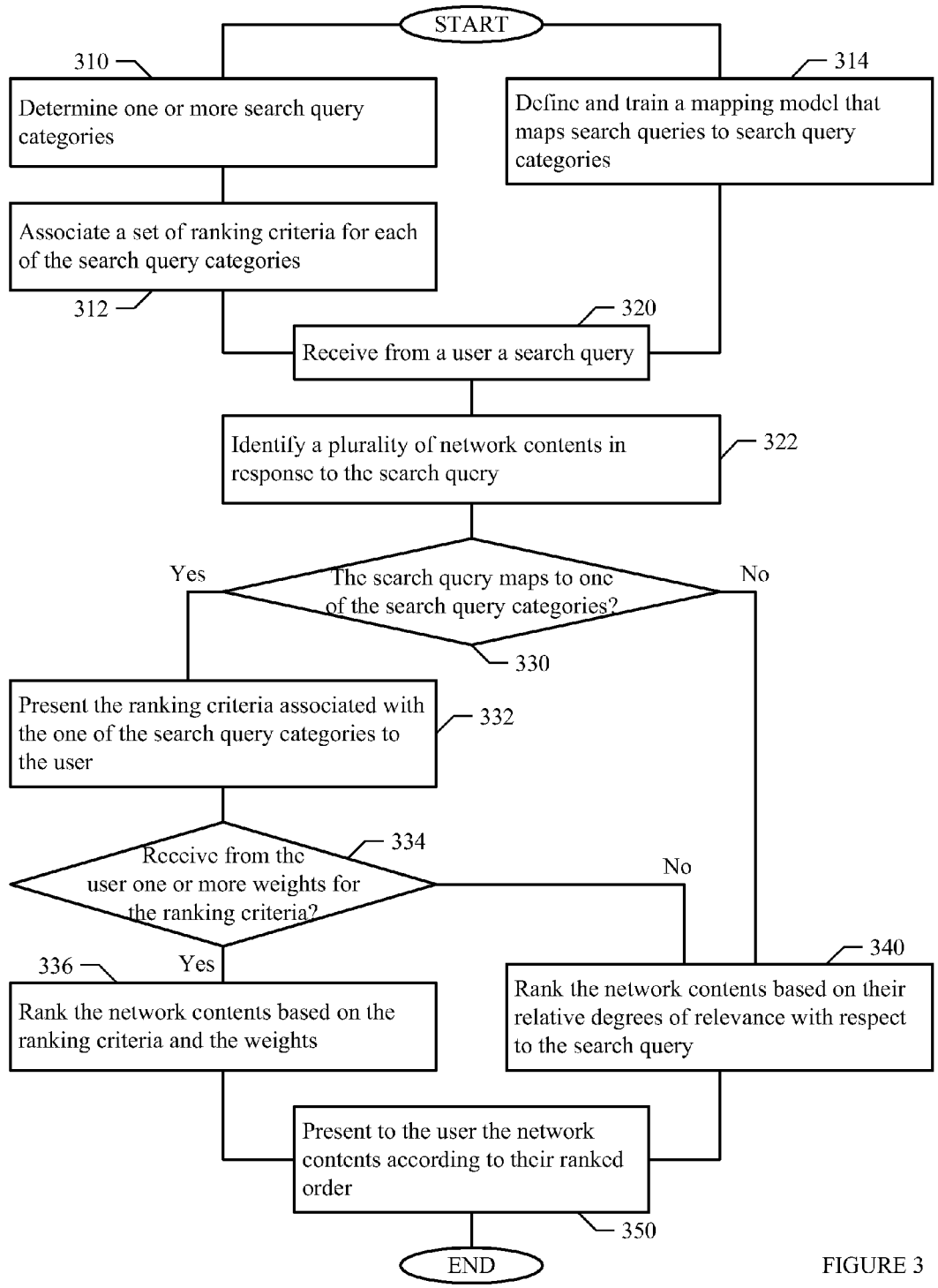
FIG. 3 illustrates an example method of customizing the ranking of the network contents identified in response to the search queries.

Particular embodiments may categorize the search queries using predetermined search query categories, where each search query category is associated with a set of ranking criteria. The search queries belonging to a specific search query category are associated with the ranking criteria of the search query category, thus avoiding the need for the search engine to determine a different set of ranking criteria for each individual search query received at the search engine. FIG. 3 illustrates an example method of customizing the ranking of the network contents identified in response to the search queries.

In particular embodiments, one or more search query categories may be determined (step 310), and a set of ranking criteria may be associated with each of the search query categories (step 312). Particular embodiments may determine the search query categories and their associated set of ranking criteria based on information extracted from historical Internet traffic data monitored and collected at a search engine, e.g., search engine 222. For example, the search queries historically received at the search engine may be grouped together based on similarities between them, and search query categories may be defined based on the characteristics or features of the individual groups of search queries. Particular embodiments may define any number of search query categories, and the search query categories may be modified at any time, e.g., adding new search query categories or removing existing search query categories. For example, one search query category may be "local restaurants", another search query category may be "digital SLR camera", and a third search query category may be "California Universities".

Particular embodiments may associate any number of ranking criteria with each of the search query categories. Particular embodiments may select specific ranking criteria for each of the search query categories based on what the historical Internet traffic data indicate as important attributes to each type of search queries. Particular embodiments may conduct surveys among the network users to determine what they consider as desirable ranking criteria for each type of search queries. For example, for search query category "local restaurants", the associated set of ranking criteria may include "customer rating", "critics review", "price", "distance", and "business hours". For search query category "digital SLR camera", the associated set of ranking criteria may include "popularity", "customer review", "CNET review", "brand name", "price", and "product release date". For search query category "California Universities", the associated set of ranking criteria may include "tuition cost", "distance", "US News university ranking", and "degree program". In addition, particular embodiments may also include the traditional ranking criteria—relevance—in the set of ranking criteria associated with each of the search query categories.

Particular embodiments may store the search query categories and their associated ranking criteria in one or more data storages, e.g., data storage 240, accessible to the search engine.

In particular embodiments, a mapping model may be defined and trained (step 314). Given a search query, the mapping model attempts to map it to a particular one of the existing search query categories. In particular embodiments, the mapping model may include a mapping function, hereinafter denoted as M( ), defined as:

$$M(q) = qc_i, \quad (2)$$

where $qc_i$ is the particular search query category to which the search query q is mapped.

In particular embodiments, each of the search query categories may be associated with a set of metadata, such as attributes or keywords, that describe the various characteristics or features of the search categories. The metadata associated with the search query categories may be used to map a particular search query to one of the search query categories. For example, for search query category "local restaurants", the associated metadata may include "food", "breakfast", "lunch", "dinner", "sushi", "seafood", "pasta", "bread", "pizza", "burger", "sandwich", "BBQ", "steak", "deli", "fast food", "Mexican food", "Italian food", "Chinese food", "Japanese food", "San Francisco", "Market street", "Fisherman's Wharf", "Chinatown", and so on. The mapping function may compare the search query with the metadata associated with each of the search query categories, and if sufficient level of similarity is found between the search query and the metadata associated with a particular search query category, the search query is mapped to that search query category. In this case, search queries such as "pizza near Market street", "seafood restaurant at Fisherman's Wharf", and "steak house in San Francisco" may all be mapped to the search query category "local restaurants".

In particular embodiments, if the intent of the network user, hereinafter denoted as t, for conducting a search is known, such user intent may be used to map the search query provided by the network user to one of the search query categories. In this case, the mapping function may map the user intent to a set of attributes. In particular embodiments, the set of attributes may then be compared with the metadata associated with the search query categories, and if sufficient level of similarity is found between the set of attributes created by the mapping function based on the user intent and the metadata associated with a particular search query category, the search query is mapped to that search query category. For example, the intent of the network user may be "recurring events", i.e., to search for information about an event that happens repeatedly over time. The corresponding attributes of this intent may be "year", "month", "date", "time", and "name of the recurring event", etc. For example, the network user may conduct a search with the query "2008 Beijing Olympics", with the intent to obtain information about the Olympic Games held in Beijing, China in 2008. In this example, the attribute "year" has the value "2008" and "name of the recurring event" has the value "Olympics". A search query category "events" may have the associated metadata "year", "month", "date", "time", "location", "popularity", "name of the event", "price", "distance", etc. The mapping function may detect that there is sufficient level of similarity between the set of attributes of the intent of the network user and the search query category, and maps the search query "2008 Beijing Olympics" to the search query category "event s".

Particular embodiments may determine the search query categories, the ranking criteria and optionally the metadata associated with the search query categories, and the mapping model as a part of the preprocessing procedure. Furthermore, Internet traffic data may be continuously monitored and collected at the search engine, e.g., search engine 222, so that information extracted from the collected Internet traffic data may be used to improve the search query categories, the ranking criteria and the metadata associated with the search query categories, and the mapping model. For example and without limitation, new search query categories may be added, the ranking criteria associated with specific search query categories may be adjusted based on network user responses, and the mapping function may be further trained.

Once the search query categories, their associated ranking criteria, and the mapping model have been determined, they may be used to provide customized ranking of the network contents identified by a search engine in response to the search queries. In particular embodiments, upon receiving from a network user a specific search query, e.g., the search query q, (step 320), the search engine identifies a plurality of network contents, e.g., web pages, based on the search query using various search algorithms implemented by the search engine (step 322). Hereinafter, let $P^q = \{p_1^q, p_2^q, \ldots, p_{n_3}^q\}$ denote the set of web pages identified by the search engine in response to the search query q with $p_i^q$ denoting a specific web page in the set $p^q$.

In particular embodiments, the search engine attempts to map the search query to one of the previously determined search query categories using the mapping model (step 330). Since the search query is generated and provided by a network user and may include any combination of words, sometimes, there may not always be an existing search query category to which the mapping model is able to map the search query. For example, if the search query describes an obscure or uncommon subject matter, e.g., "pyramidal tract of the brain", there may not be a suitable search query category already defined for it. Other times, even if the search query describes a common subject matter, the mapping model may not be able to map it to a particular search query category due to various reasons, such as how the search query is worded.

If the mapping model is unable to map the search query to one of the search query categories (step 330, "NO"), then the identified network contents, e.g., web pages, are ranked based on their relative degrees of relevance with respect to the search query (step 340), i.e., using the traditional relevance ranking algorithms. On the other hand, if the mapping model is able to map the search query to one of the search query categories (step 330, "YES"), then the ranking criteria associated with the specific search query category to which the search query is mapped may be presented to the user (step 332). For example and without limitation, the ranking criteria may be presented using a dynamically generated web page transmitted to a client device, e.g., client 230, used by the user.

Particular embodiments provide the user with the option of whether to customize the ranking of the identified network contents. For example and without limitation, in addition to the ranking criteria, the dynamically generated web page may also contain options that enable the user to select whether to use the customized ranking algorithm or the traditional relevance ranking algorithm. If the user wishes to use the traditional relevance ranking algorithm without any additional customization, the user may indicate his desire to the search engine by selecting the appropriate option provided in the dynamically generated web page (step 334, "NO"). In this case, the identified network contents, e.g., web pages, are ranked based on their relative degrees of relevance with respect to the search query (step 340).

On the other hand, if the user wishes to use the customized ranking algorithm, the user may assign weights to each of the ranking criteria contained in the dynamically generated web page and submit the weights to the search engine (step 334, "YES"). Each weight indicates how important the associate ranking criterion is to the user. For example, for search query category "local restaurants", the associated set of ranking criteria may include "customer rating", "critics review", "price", "distance", and "business hours". If "customer rating" and "price" are more important to the user, the user may assign higher weights to these two ranking criteria. Conversely, if "distance" is less important to the user, the user may assign lower weights to this ranking criterion. If the user does not wish the customized ranking algorithm to take a specific ranking criterion into consideration when ranking the identified network contents, e.g. "business hours", the user may assign 0 as its weight. In particular embodiments, default weights may initially be provided together with the ranking criteria, which may subsequently be adjusted by the user. In particular embodiments, the weights are expressed as a percentage and the sum of all the individual weights is 100%.

Upon receiving the user-assigned weights for the ranking criteria, the search engine may use the ranking criteria and their assigned weights to rank the identified network contents, e.g., web pages (step 336). Hereinafter, let W denote a set of weights assigned to a set of ranking criteria and w denote a specific weight assigned to a specific ranking criterion by the user, and R( ) denote the customized ranking function. The weights assigned to the ranking criteria for the search query q may be $W^q = \{w_1^q, w_2^q, \ldots, w_{n_1}^q\}$. Particular embodiments may define the customized ranking function as:

$$R(q) = R(A(q)) = R(C^q) = R(c_1^q, c_2^q, \ldots, c_{n_1}^q), \quad (3a)$$

where $R(c_1^q, c_2^q, \ldots, c_{n_1}^q)$ is the combination of the set of ranking criteria determined for the search query q. In particular embodiments, with a linear-weighted scheme, R( ) may be further defined as:

$$R(q) = \sum_{i=1}^{i=n_1} c_i^q \cdot w_i^q, \quad (3b)$$

where $w_i^q$ is the weight assigned by the network user to the ranking criterion $c_i^q$. Note that in particular embodiments, relevance may be one of the ranking criteria, and may be treated as other ranking criteria such that the user may also assign weight to the ranking criterion "relevance".

In particular embodiments, each of the identified web pages may be associated with a set of page-level or site-level attributes, hereinafter denoted as $A^{p_i^q} = \{a_1^{p_i^q}, a_2^{p_i^q}, \ldots, a_{n_4}^{p_i^q}\}$. Typically, the attributes describe the properties of the object represented by the web page, or the properties of the web page itself. For example, a web page about the MBA program at a local university may have the attributes "ranking", "review ratings", "tuition costs", "year founded", "number of enrollment", and "length of program", etc. A web page about a computer programming language may have the attributes "popularity", "authoritativeness", "name of the programming language", and "time of last update", etc. These attributes may be extracted from the web page by using a template-based model learned from observing a large number of example web pages of similar topics. On the other hand, attributes such as the "authoritativeness" of a web page may be machine learned by data mining the hyperlinked web graph, by associating the page with the official branding of a product, etc.

For each of the identified web pages, particular embodiments may establish a one-to-one correspondence, hereinafter denoted as C( ), between the set of ranking criteria determined for the search query and the set of attributes associated with the web page, such that for the search query and each of the web pages identified by the search engine in response to the search query, $C^{p_i^q} = \{c_1^{p_i^q} = a_1^{p_i^q}, c_2^{p_i^q} = a_2^{p_i^q}, \ldots, c_{n_2}^{p_i^q} = a_{n_2}^{p_i^q}\}$, where $p_i^q$ specific web page identified by the search engine in response to the search query q.

Particular embodiments may customize the ranking algorithm as:

$$R\left(q, \prod_D\right) = \operatorname{argmin}\left\{\prod_D\right\} \quad (4)$$

$$\left[\sum \{p_u^q, p_v^q \in \prod_D\} L(R(q), C^{p_u^q}, C^{p_v^q})\right],$$

where $\prod_D$ is an order set of the identified web pages $p^q$, $p_u^q$ and $p_v^q$ are two of the identified web pages with $p_u^q$ being ranked higher than $p_v^q$ according to relevance, and L( ) is a loss function. Note that $\prod_D$ may denote any possible ordered sequence of the identified web pages. In particular embodiments, the ranking algorithm essentially searches for one ordered sequence that minimizes the loss due to the reversal of the order given the ranking criteria. Particular embodiments define L( ) as:

$$L() = \sum_{i=1}^{i=n_2} \left(c_i^{p_u^q} - c_i^{p_v^q}\right) \cdot w_i^q, \forall c_i^q \in R(q). \quad (5)$$

In particular embodiments, the search query's ranking criteria match that of the web pages. The user may only interact with (e.g., see, select, and assign weights to) the rank criteria of the search query he/she has issued. The criteria are then matched with the attributes of the web pages in the search results as described above. Consequently, the user may specify what or how to retrieve all or a subset of the attributes of the web pages for ranking and to pass the corresponding weights to those attributes. As a result, the ranking algorithm will operate based on the attributes of the web pages and the associated weights of the corresponding rank criteria.

In particular embodiments, the customized ranking function penalizes the reversal of the pair-wise ordering of the two identified network contents according to the associated ranking criteria and their assigned weights chosen by the user.

Particular embodiments may train the customized ranking algorithm using information extracted for the historical Internet traffic data.

In particular embodiments, if the intent of the network user for conducting a search is known, such user intent may be mapped to a subset of the attributes associated with the identified web pages using a second mapping function, hereinafter denoted as F( ), defined as:

$$F(t) = A^t \subseteq A, \text{ where } A^t = \{a_1^t, a_2^t, \ldots a_{n_5}^t\}. \quad (6)$$

For any query intent t, a machine-learned ranking model may be trained based on the corresponding subset of attributes, F(t). The loss function to be minimized may be defined as the costs of reversal of the desired order.

Given the knowledge about the user's intent, particular embodiments may augment user's choice of rank criteria, e.g., suggest new criteria, assign more weights to one or more criteria, etc. In addition to relying on the search query, user's intent may provide more comprehensive or accurate heuristics for ranking criteria selection and weighting. For example, consider the search query "Canon DSLR bodies". The user may be presented with the ranking criteria based on the search query: "price", "review ratings", and "product release year".

However, if by data mining the query history, the system learns that the user's intent is not to purchase but to learn more about the Canon DSLR system, the rank criteria can be augmented to include attributes such as "authoritativeness", "popularity" etc. that indicates the authoritativeness/popularity of the web pages describing Canon's product line.

Often, the search engine may identify hundreds of network contents in response to a specific search query. Some of these network contents may have little relevance to the search query. To avoid unintentionally biasing the ranking order, in particular embodiments, the network contents are first ranked according to their relative degrees of relevance with respect to the search query. Then, ranking of those network contents that have ranked above a predetermined threshold, e.g., the top 50 ranked network contents or the top 20% ranked network contents, are further adjusted based on the user-specified ranking criteria and their weights as described above.

After the identified network contents have been ranked using the customized ranking algorithm (step 336) or the traditional relevance ranking algorithm (step 340), they may be presented to the user according to their ranked order (step 350). For example, relatively higher ranked network contents may be presented before the relatively lower ranked network contents.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 4:
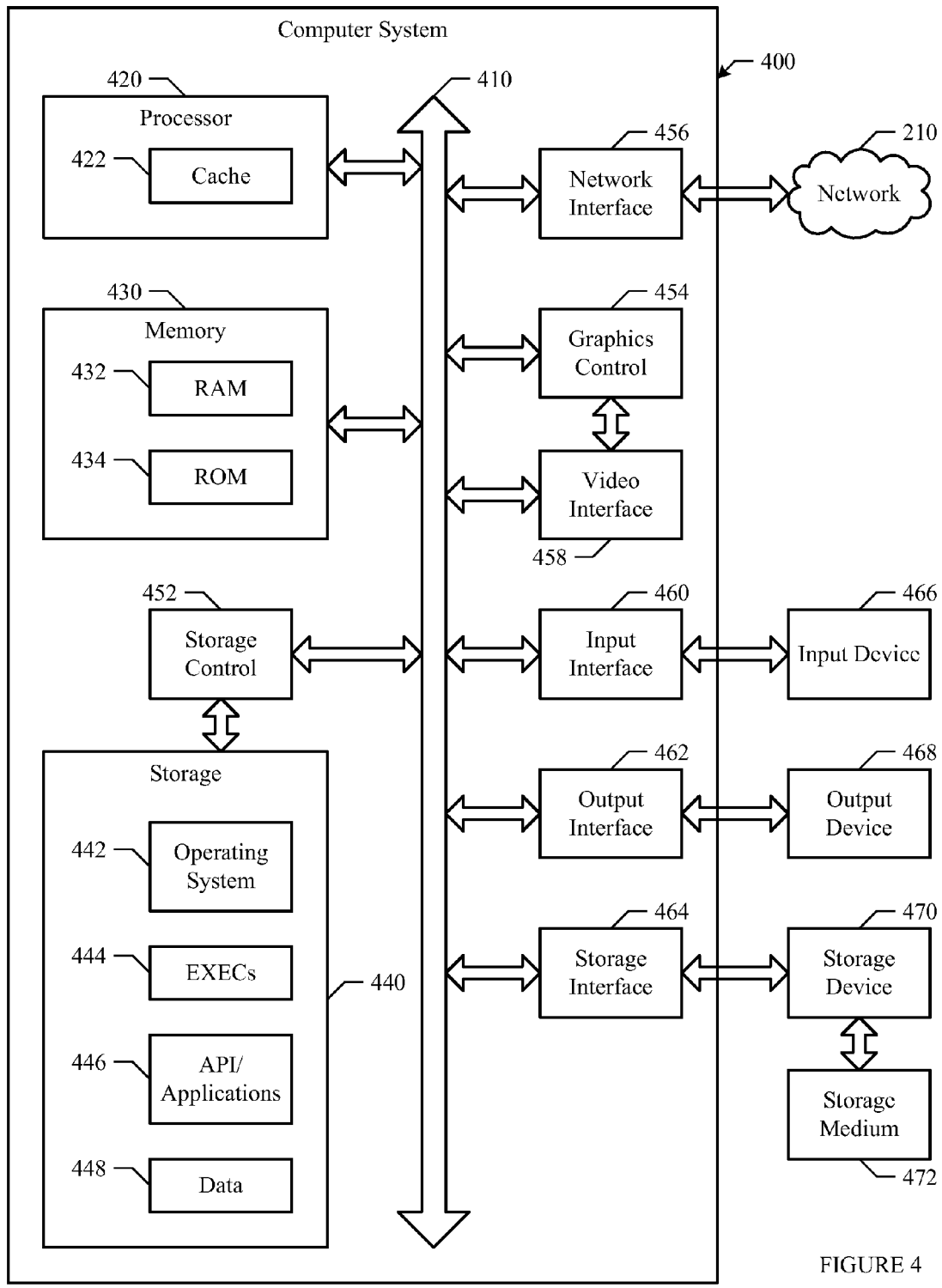
FIG. 4 illustrates a general computer system suitable for implementing embodiments of the present disclosure.

For example, FIG. 4 illustrates an example computer system 400 suitable for implementing one or more portions of particular embodiments. Although the present disclosure describes and illustrates a particular computer system 400 having particular components in a particular configuration, the present disclosure contemplates any suitable computer system having any suitable components in any suitable configuration. Moreover, computer system 400 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 410 couples subsystems of computer system 400 to each other. Herein, reference to a bus encompasses one or more digital signal lines serving a common function. The present disclosure contemplates any suitable system bus 410 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 400 includes one or more processors 420 (or central processing units (CPUs)). A processor 420 may contain a cache 422 for temporary local storage of instructions, data, or computer addresses. Processors 420 are coupled to one or more storage devices, including memory 430. Memory 430 may include random access memory (RAM) 432 and read-only memory (ROM) 434. Data and instructions may transfer bidirectionally between processors 420 and RAM 432. Data and instructions may transfer unidirectionally to processors 420 from ROM 434. RAM 432 and ROM 434 may include any suitable computer-readable storage media.

Computer system 400 includes fixed storage 440 coupled bi-directionally to processors 420. Fixed storage 440 may be coupled to processors 420 via storage control unit 452. Fixed storage 440 may provide additional data storage capacity and may include any suitable computer-readable storage media. Fixed storage 440 may store an operating system (OS) 442, one or more executables 444, one or more applications or programs 446, data 448, and the like. Fixed storage 440 is typically a secondary storage medium (such as a hard disk) that is slower than primary storage. In appropriate cases, the information stored by fixed storage 440 may be incorporated as virtual memory into memory 430.

Processors 420 may be coupled to a variety of interfaces, such as, for example, graphics control 454, video interface 458, input interface 460, output interface 462, and storage interface 464, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 456 may couple processors 420 to another computer system or to network 210. With network interface 456, processors 420 may receive or send information from or to network 210 in the course of performing steps of particular embodiments. Particular embodiments may execute solely on processors 420. Particular embodiments may execute on processors 420 and on one or more remote processors operating together.

In a network environment, where computer system 400 is connected to network 210, computer system 400 may communicate with other devices connected to network 210. Computer system 400 may communicate with network 210 via network interface 456. For example, computer system 400 may receive information (such as a request or a response from another device) from network 210 in the form of one or more incoming packets at network interface 456 and memory 430 may store the incoming packets for subsequent processing. Computer system 400 may send information (such as a request or a response to another device) to network 210 in the form of one or more outgoing packets from network interface 456, which memory 430 may store prior to being sent. Processors 420 may access an incoming or outgoing packet in memory 430 to process it, according to particular needs.

Computer system 400 may have one or more input devices 466 (which may include a keypad, keyboard, mouse, stylus, etc.), one or more output devices 468 (which may include one or more displays, one or more speakers, one or more printers, etc.), one or more storage devices 470, and one or more storage medium 472. An input device 466 may be external or internal to computer system 400. An output device 468 may be external or internal to computer system 400. A storage device 470 may be external or internal to computer system 400. A storage medium 472 may be external or internal to computer system 400.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 430 may include one or more computer-readable storage media embodying software and computer system 400 may provide particular functionality described or illustrated herein as a result of processors 420 executing the software. Memory 430 may store and processors 420 may execute the software. Memory 430 may read the software from the computer-readable storage media in mass storage device 430 embodying the software or from one or more other sources via network interface 456. When executing the software, processors 420 may perform one or more steps of one or more processes described or illustrated herein, which may include defining one or more data structures for storage in memory 430 and modifying one or more of the data structures as directed by one or more portions the software, according to particular needs. In addition or as an alternative, computer system 400 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method implemented on a machine having at least one processor, storage, and a communication platform, comprising:
    performing by the at least one processor the steps of:
    receiving a search query from a user;
    identifying a plurality of network contents in response to the search query;
    determining a plurality of ranking criteria for the search query, wherein the plurality of ranking criteria includes at least one criterion different from a criterion of relevance;
    presenting the plurality of ranking criteria to the user so that the user can selectively assign one or more weights to individual ones of the plurality of ranking criteria;
    receiving from the user the one or more weights assigned by the user to the individual ones of the plurality of ranking criteria;
    ranking the network contents identified in response to the search query based on the plurality of ranking criteria and the one or more weights assigned by the user; and
    presenting the network contents to the user in an order according to their ranking.

2. The method of claim 1, further comprising:
    determining one or more search query categories; and
    determining at least one ranking criterion for each of the search query categories.

3. The method of claim 2, wherein determining the plurality of ranking criteria for the search query comprises:
    mapping the search query to one of the search query categories, and
    associating the at least one ranking criterion for the one of the search query categories with the search query.

4. The method of claim 3, further comprising the at least one processor performing the steps of:
    implementing a mapping model that maps the search query to the one of the search query categories; and
    training the mapping model using historical Internet traffic data.

5. The method of claim 3, further comprising the at least one processor performing the step of:
    determining one or more keywords for each of the search query categories,
    wherein mapping the search query to the one of the search query categories comprises:
        comparing the search query with the one or more keywords for each of the search query categories, and
        mapping the search query to the one of the search query categories having the one or more keywords that are most similar to the search query.

6. The method of claim 1, wherein ranking the network contents based on the plurality of ranking criteria and the one or more weights comprises:
    ranking the network contents based on their relative degrees of relevance with respect to the search query,
    selecting one or more of the network contents that ranked above a ranking threshold, and
    adjusting the ranking of the selected network contents based on the plurality of ranking criteria and the one or more weights.

7. The method of claim 1, further comprising the at least one processor performing the step of:
    implementing a ranking model that ranks the network contents based on the plurality of ranking criteria,
    wherein ranking the network contents based on the plurality of ranking criteria and the one or more weights comprises:

ranking the network contents based on their relative degrees of relevance with respect to the search query, and for each unique pair of network contents from the ranked network contents comprising a first network content and a second network content, the first network content being ranked higher than the second network content, penalizing a reversal of the ranking between the first network content and the second network content using the ranking model.

8. A system, comprising:

at least one processor; and a memory configured for storing instructions that, when executed by the at least one processor, cause the at least one processor to:

receive a search query from a user, identify a plurality of network contents in response to the search query, determine a plurality of ranking criteria for the search query, wherein the plurality of ranking criteria includes at least one criterion different from a criterion of relevance, present the plurality of ranking criteria to the user so that the user can selectively assign one or more weights to individual ones of the plurality of ranking criteria, receive from the user the one or more weights assigned by the user to the individual ones of the plurality of ranking criteria, rank the network contents identified in response to the search query based on the plurality of ranking criteria and the one or more weights assigned by the user, and present the network contents to the user in an order according to their ranking.

9. The system of claim 8, wherein the instructions, when executed by the at least one processor, further cause the at least one processor to:

determine one or more search query categories, and determine at least one ranking criterion for each of the search query categories.

10. The system of claim 9, wherein the instructions that, when executed by the at least one processor, cause the at least one processor to determine the plurality of ranking criteria for the search query include instructions to:

map the search query to one of the search query categories, and associate the at least one ranking criterion for the one of the search query categories with the search query.

11. The system of claim 10, wherein the instructions, when executed by the at least one processor, further cause the at least one processor to:

implement a mapping model that maps the search query to the one of the search query categories, and train the mapping model using historical Internet traffic data.

12. The system of claim 10, wherein the instructions, when executed by the at least one processor, further cause the at least one processor to:

determine one or more keywords for each of the search query categories, wherein the instructions that, when executed by the at least one processor, cause the at least one processor to map the search query to the one of the search query categories include instructions to:

compare the search query with the one or more keywords for each of the search query categories, and map the search query to the one of the search query categories having the one or more keywords that are most similar to the search query.

13. The system of claim 8, wherein the instructions that, when executed by the at least one processor, cause the at least one processor to rank the network contents based on the plurality of ranking criteria and the one or more weights include instructions to:

rank the network contents based on their relative degrees of relevance with respect to the search query, select one or more of the network contents that ranked above a ranking threshold, and adjust the ranking of the selected network contents based on the plurality of ranking criteria and the one or more weights.

14. The system of claim 8, wherein the instructions, when executed by the at least one processor, further cause the at least one processor to:

implement a ranking model that ranks the network contents based on the plurality of ranking criteria, wherein the instructions that, when executed by the at least one processor, cause the at least one processor to rank the network contents based on the plurality of ranking criteria and the one or more weights include instructions to:

rank the network contents based on their relative degrees of relevance with respect to the search query, and for each unique pair of network contents from the ranked network contents comprising a first network content and a second network content, the first network content being ranked higher than the second network content, penalize a reversal of the ranking between the first network content and the second network content using the ranking model.

15. A non-transitory storage medium having stored thereon computer-readable code for causing at least one processor to:

receive a search query from a user;

identify a plurality of network contents in response to the search query;

determine a plurality of ranking criteria for the search query, wherein the plurality of ranking criteria includes at least one criterion different from a criterion of relevance;

present the plurality of ranking criteria to the user so that the user can selectively assign one or more weights to individual ones of the plurality of ranking criteria;

receive from the user the weights assigned by the user to the individual ones of the plurality of ranking criteria;

rank the network contents identified in response to the search query based on the plurality of ranking criteria and the one or more weights assigned by the user; and present the network contents to the user in an order according to their ranking.

16. The medium of claim 15, wherein the computer-readable code further causes the at least one processor to:

determine one or more search query categories; and determine at least one ranking criterion for each of the search query categories.

17. The medium of claim 16, wherein the computer-readable code that causes the at least one processor to determine the plurality of ranking criteria for the search query comprises code to:

map the search query to one of the search query categories, and associate the at least one ranking criterion for the one of the search query categories with the search query.

18. The medium of claim 17, wherein the computer-readable code further causes the at least one processor to:
  implement a mapping model that maps the search query to the one of the search query categories; and
  train the mapping model using historical Internet traffic data.

19. The medium of claim 17, wherein the computer-readable code further causes the at least one processor to:
  determine one or more keywords for each of the search query categories,
  wherein the computer-readable code that causes the at least one processor to map the search query to the one of the search query categories comprises code to:
    compare the search query with the one or more keywords for each of the search query categories, and
    map the search query to the one of the search query categories having the one or more keywords that are most similar to the search query.

20. The medium of claim 15, wherein the computer-readable code that causes the at least one processor to rank the network contents based on the plurality of ranking criteria and the one or more weights comprises code to:
  rank the network contents based on their relative degrees of relevance with respect to the search query,
  select one or more of the network contents that ranked above a ranking threshold, and
  adjust the ranking of the selected network contents based on the plurality of ranking criteria and the one or more weights.

21. The medium of claim 15, wherein the computer-readable code further causes the at least one processor to:
  implement a ranking model that ranks the network contents based on the plurality of ranking criteria,
  wherein the computer-readable code that causes the at least one processor to rank the network contents based on the plurality of ranking criteria and the one or more weights comprises code to:
    rank the network contents based on their relative degrees of relevance with respect to the search query, and
    for each unique pair or network contents from the ranked network contents comprising a first network content and a second network content, the first network content being ranked higher than the second network content, penalize a reversal of the ranking between the first network content and the second network content using the ranking model.

\* \* \* \* \*